(12) United States Patent
Seaman et al.

(10) Patent No.: US 11,120,693 B2
(45) Date of Patent: Sep. 14, 2021

(54) PROVIDING INTER-VEHICLE DATA COMMUNICATIONS FOR VEHICULAR DRAFTING OPERATIONS

(71) Applicant: BlackBerry Limited, Waterloo (CA)

(72) Inventors: Conrad Delbert Seaman, Ottawa (CA); Edward Snow Willis, Ottawa (CA); Christopher Scott Travers, Ottawa (CA)

(73) Assignee: BlackBerry Limited, Ontario (CA)

( * ) Notice: Subject to any disclaimer, the term of this patent is extended or adjusted under 35 U.S.C. 154(b) by 310 days.

(21) Appl. No.: 15/955,396

(22) Filed: Apr. 17, 2018

(65) Prior Publication Data
US 2019/0318631 A1 Oct. 17, 2019

(51) Int. Cl.
| | |
|---|---|
| G08G 1/00 | (2006.01) |
| H04W 4/46 | (2018.01) |
| G06Q 20/32 | (2012.01) |
| H04W 76/10 | (2018.01) |
| G06Q 50/30 | (2012.01) |
| H04W 12/02 | (2009.01) |
| G05D 1/02 | (2020.01) |

(52) U.S. Cl.
CPC ............ *G08G 1/22* (2013.01); *G06Q 20/325* (2013.01); *G06Q 50/30* (2013.01); *H04W 4/46* (2018.02); *H04W 12/02* (2013.01); *H04W 76/10* (2018.02); *G05D 1/0287* (2013.01)

(58) Field of Classification Search
CPC ............ G06Q 30/02; G05D 1/02; G05D 1/00
See application file for complete search history.

(56) References Cited

U.S. PATENT DOCUMENTS

| | | | | |
|---|---|---|---|---|
| 6,356,820 | B1* | 3/2002 | Hashimoto | G08G 1/22 180/167 |
| 10,096,067 | B1* | 10/2018 | Slusar | G06Q 40/08 |
| 2010/0256852 | A1* | 10/2010 | Mudalige | G08G 1/163 701/24 |
| 2013/0211624 | A1* | 8/2013 | Lind | G08G 1/22 701/2 |

(Continued)

OTHER PUBLICATIONS

Hoque and Kwon, "Research Article: An Emergency Packet Forwarding Scheme for V2V Communication Networks," Hindawi Publishing Corporation, The Scientific World Journal, vol. 2014, Article IDS 480435, Jun. 25, 2014, 8 pages.

*Primary Examiner* — Kira Nguyen
(74) *Attorney, Agent, or Firm* — Fish & Richardson P.C.

(57) ABSTRACT

Systems, methods, and software can be used to provide inter-vehicle data communications for drafting operations. In some aspects, a method is disclosed comprising: selecting, by a hardware processor of a first vehicle, a second vehicle as a candidate for a drafting group; receiving, from the second vehicle, a drafting capability indication; in response to receiving the drafting capability indication, transmitting, from the first vehicle to the second vehicle, a drafting request; receiving, from the second vehicle, a drafting response; determining, by the hardware processor of the first vehicle, to establish the drafting group including the first vehicle and the second vehicle; and transmitting, from the first vehicle to the second vehicle, a drafting confirmation, wherein the drafting confirmation indicates that the first vehicle agrees to establish the drafting group with the second vehicle.

17 Claims, 3 Drawing Sheets

(56) References Cited

U.S. PATENT DOCUMENTS

| | | | |
|---|---|---|---|
| 2016/0104183 A1* | 4/2016 | Moore | G06Q 30/018 |
| | | | 701/23 |
| 2017/0001639 A1* | 1/2017 | Dempsey | B60W 30/146 |
| 2017/0293296 A1* | 10/2017 | Stenneth | G01C 21/3438 |
| 2017/0308097 A1* | 10/2017 | Switkes | H04L 67/12 |
| 2017/0344023 A1* | 11/2017 | Laubinger | B60W 50/14 |
| 2017/0349176 A1* | 12/2017 | Alden | G05D 1/0293 |
| 2017/0369062 A1* | 12/2017 | Saigusa | B60W 30/16 |
| 2018/0079405 A1* | 3/2018 | Gaither | B60G 17/0165 |
| 2019/0064934 A1* | 2/2019 | McQuillen | G06F 3/0216 |
| 2019/0220037 A1* | 7/2019 | Vladimerou | G05D 1/0088 |
| 2019/0236959 A1* | 8/2019 | Belapurkar | G06Q 20/3224 |
| 2019/0272760 A1* | 9/2019 | McQuillen | G08G 1/0968 |

\* cited by examiner

PROVIDING INTER-VEHICLE DATA COMMUNICATIONS FOR VEHICULAR DRAFTING OPERATIONS

TECHNICAL FIELD

The present disclosure relates to providing inter-vehicle data communications for vehicular drafting operations.

BACKGROUND

In the context of vehicular operations, drafting refers to an operation in which two or more vehicles are moving at approximately the same speed in a close group. The space between these vehicles can be short (for example on the order of tens of feet). By following the lead vehicle in such a short distance, these vehicles can take advantages of reduced wind resistance and save fuel. The savings can increase as the speed of the vehicles in the group increases. Drafting can also be referred to as slipstreaming or hypermiling.

DETAILED DESCRIPTION

In some cases, a vehicle may be controlled by an autopilot processing platform. The autopilot processing platform may generate autopilot commands. These autopilot commands are directed to components of the vehicle to control the movements of the vehicle. Examples of the components include without limitation steering wheel, brakes, accelerator, lights, and the like. Examples of the autopilot commands include without limitation accelerate, decelerate, turn left or right, signal, and the like. A vehicle equipped with the autopilot processing platform can be referred to as a self-driving vehicle, a driver-less vehicle, an autonomous or semi-autonomous vehicle, or an autopilot vehicle.

In some cases, the autopilot processing platform receives inputs from one or more sensors installed on the vehicle. The one or more sensors may generate video or audio inputs that reflect the surroundings of the vehicle. The autopilot processing platform may include one or more autopilot processors that generate autopilot commands based on these inputs. Examples of the sensors can include lenses, microphones, laser, radar, ultrasonic, light detection and ranging (LIDAR) or any other sensors.

While drafting can provide fuel savings, driving close to each other can also introduce safety risks. Therefore, drafting may not be suitable for human drivers. However, autopilot processing platform can make fast and consistent driving commands, and therefore can be used to perform drafting operations to achieve fuel savings with reduced risks.

In some cases, vehicles can transmit data between one another. For example, one vehicle can transmit information about the traffic around the vehicle to another vehicle. This information can include environmental information such as streetlights, buildings, obstacles, cyclists, or pedestrians that are captured by the sensor of the vehicle. This information can also include information related to the driving actions of the vehicle, e.g., information of speed, acceleration, turning. These data can be used for the receiving vehicle to perform autopilot processing and generate autopilot or semi-autopilot commands for the receiving vehicle.

In some cases, inter-vehicle data communications can be performed using vehicle-to-vehicle (V2V) communication protocols. V2V refers to communication between any two Intelligent Transportation Service (ITS) capable vehicles. V2V enables transport entities, such as vehicles, to obtain and share information regarding their local environment in order to process and share knowledge for more intelligent transport related services or applications, for example, cooperative route planning, cooperative collision warning, or autonomous driving. In some cases, V2V can refer to services provided to a user equipment for communication supporting vehicle oriented services. Examples of vehicle oriented services include road safety, (transport) traffic efficiency, and other application services. One will appreciate that the terminology in this disclosure is directed at communications between vehicles, intelligent transport service capable devices, roadside units, and pedestrians, etc. However, the technology is also applicable to other types of transportation systems, their infrastructure and passengers, e.g., trains, track side signaling, passengers, aerial vehicles, drones, etc., and vehicles that can communicate with trackside signaling, e.g., cars at level crossings etc. In some cases, the inter-vehicle data communications can also be carried out using vehicle-to-infrastructure (V2I) communication protocols. For example, alternative to or in combination with transmitting a V2V message from a first vehicle to a second vehicle, the first vehicle can transmit a V2I message to a server, and the server can forward the V2I message to the second vehicle.

In a V2V communication system, inter-vehicle communication protocols can be enhanced to facilitate drafting operations of multiple vehicles. Vehicles can use V2V messages to establish, modify, and discontinue a drafting group, and communicate driving information among the vehicles in the drafting group. This approach can enable autopilot processing platforms of the vehicles to integrate the drafting operations with the auto pilot processing of the vehicles, and therefore improve the transportation efficiency of the traffic system while reducing risks.

Figure 1:
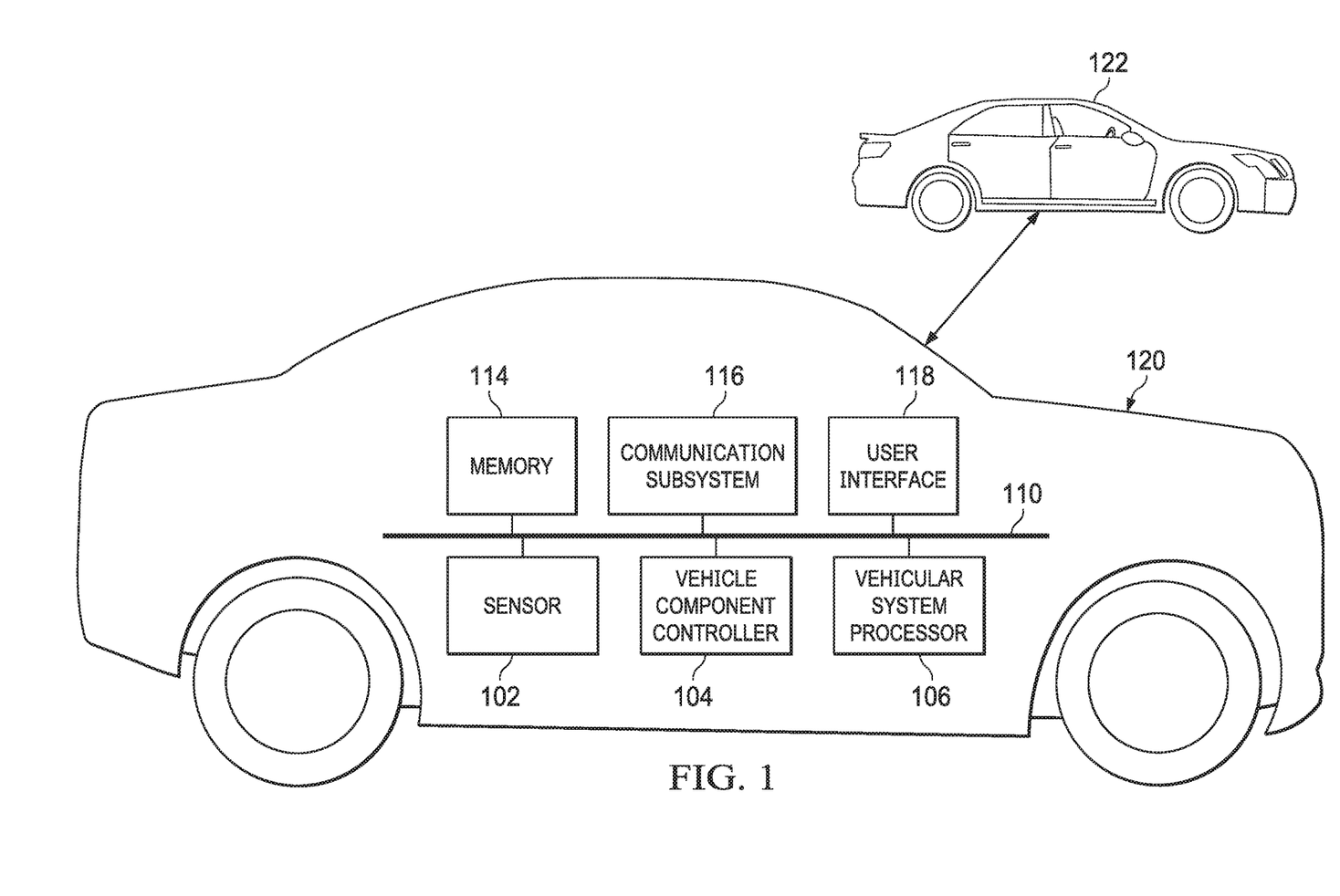
FIG. 1 is a schematic diagram showing an example communication system that provides inter-vehicle data communications for vehicular drafting operations, according to an implementation.

FIG. 1 is a schematic diagram showing an example communication system 100 that provides inter-vehicle data communications for vehicular drafting operations, according to an implementation. At a high level, the example communication system 100 includes a first vehicle 120 and a second vehicle 122 that are communicatively coupled with each other.

A vehicle, e.g., the first vehicle 120 and the second vehicle 122, can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the first vehicle 120 includes a sensor 102, a vehicle component controller 104, a vehicular system processor 106, a communication subsystem 116, a user interface 118, and memory 114 that are connected to a bus 110. The second vehicle 122, though not illustrated, can include similar components as the first vehicle 120.

The first vehicle 120 includes a sensor 102. Although illustrated as a single sensor 102 in FIG. 1, the first vehicle 120 can include two or more sensors 102. The sensor 102 can include any device that detects or measures information for the first vehicle 120. For example, the sensor 102 can include devices that capture environmental information that is external to the first vehicle 120, such as microphones, cameras, radars, laser transmitters and receivers, and the like. These sensors can provide environmental inputs for an autopilot processing platform operating on the first vehicle 120 to make autopilot decisions. The sensor 102 can also include devices that capture information that is internal to the first vehicle 120, such as monitors for components such as engine, battery, fuel, electronic system, cooling systems and the like. These sensors can provide operation status and warnings to the autopilot processing platform operating on the first vehicle 120.

The first vehicle 120 includes a vehicle component controller 104. Although illustrated as a vehicle component controller 104 in FIG. 1, the first vehicle 120 can include two or more vehicle component controllers 104. The vehicle component controller 104 represents a controller that controls the operation of a component on the first vehicle 120. Examples of the components can include engine, accelerator, brake, radiator, battery, steering wheel, transmission system, cooling system, electrical system, and any other components of the first vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the autopilot processing platform operating on the first vehicle 120. Generally, the vehicular system processor 106 executes instructions and manipulates data to perform the operations of the driving processing platform. The vehicular system processor 106 can receive inputs from the sensor 102 and generate commands to the vehicle component controller 104. In some cases, the vehicular system processor 106 can perform autopilot operations. In some cases, the vehicular system processor 106 can include a data processing apparatus.

The communication subsystem 116 can be configured to provide wireless or wireline communication for data or control information provided by the vehicular system processor 106, the security monitoring processor 112, or both. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver. The communication subsystem 116 can support inter-vehicle communication protocols, for example V2V communication protocols, to communicate with other vehicles, e.g., the second vehicle 122.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the first vehicle 120 and various other computer-executable software programs for performing one or more of the processes, steps, or actions described above.

As illustrated, the bus 110 provides a communication interface for components of the autopilot processing platform operating on the first vehicle 120. In some cases, the bus 110 can be implemented using a Controller Area Network (CAN) bus.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

Figure 2:
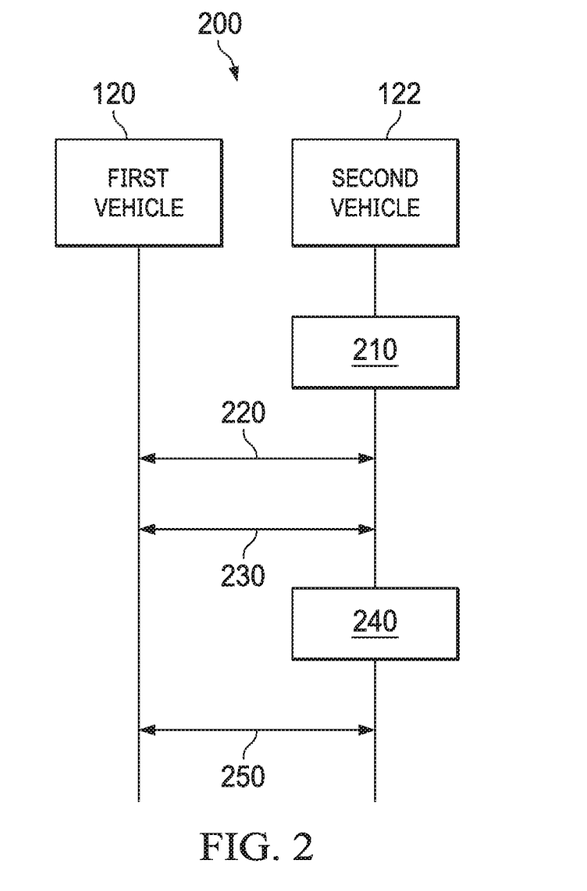
FIG. 2 is a flow diagram showing an example process that provides inter-vehicle data communications for vehicular drafting operations, according to an implementation.

FIG. 2 is a flow diagram showing an example process 200 that provides inter-vehicle data communications for vehicular drafting operations, according to an implementation. The process 200 can be implemented by the first vehicle 120 (including the components of the first vehicle 120, for example, the security monitoring processor 112) and the second vehicle 122, as shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 200 begins at 210, wherein the second vehicle 122 selects a vehicle as a candidate leader of a drafting group. The second vehicle 122 can use its sensors, e.g., one or more cameras, to record driving operations of the vehicles near the second vehicle 122. The vehicular system processor of the second vehicle 122 can further determine the driving parameters of these vehicles, e.g., the speed and acceleration pattern, by processing the recorded images. The driving parameters can be instantaneous driving parameters, average driving parameters, or both. The vehicular system processor of the second vehicle 122 can determine whether a particular vehicle is a suitable candidate leader based on the determined driving parameters. In some cases, a drafting profile can be stored at the second vehicle 122. The drafting profile can be configured by a manufacturer of the second vehicle 122, a user of the second vehicle 122, a security administrator of the second vehicle 122, or any other entities. The drafting profile can include information of driving parameters of a vehicle that is acceptable as a leader vehicle of the second vehicle 122. For example, the drafting profile can include that a range of speed, driving parameters indicating driving behaviors (e.g., magnitude and frequency of accelerations and decelerations). The drafting profile can also include other information related to efficiency and safety of drafting operations, for example, the size of the vehicle. A vehicle having a larger size can create a draft window for following vehicles, but a vehicle having a smaller size may not provide much savings for following vehicles. The vehicular system processor of the second vehicle 122 can retrieve the stored drafting profile, compare the driving parameters of the vehicles near the second vehicle 122 vehicles, and select a candidate leader that matches the drafting profile. Additionally, the vehicular system processor of the second vehicle 122 can also receive user inputs through a user interface of the second vehicle 122 to confirm or reject candidate leaders.

In the illustrated example, the second vehicle 122 selects the first vehicle 120 as the candidate leader. At 220, the second vehicle 122 communicates with the first vehicle 120 to establish a drafting group. In some cases, the first vehicle 120 can broadcast a drafting indication. The drafting capability indication can indicate whether the first vehicle 120 has a capability or interest to be a leader in a drafting group. Drafting operations may incur safety risks and some vehicles may not be configured to engage in drafting operations. In some cases, some vehicles may be open to engage in drafting operations as followers but not as leaders. The second vehicle 122 can discard the first vehicle 120 and search for a different candidate leader if the drafting capability indication indicates that the first vehicle does not have the capability to be a leader in a drafting group. The drafting capability indication can be broadcasted using a V2V communication protocol, e.g., in a multi-hop or a packet forwarding V2V message.

In some implementations, the first vehicle 120 can broadcast drafting setup information related to the drafting operations. The drafting setup information can include the identity of the first vehicle 120, e.g., licensing number, Vehicle Identification Number (VIN), or other identity information. The drafting setup information can also include V2V communication compatibility information such as versions of the V2V communication protocol or extensions of the V2V communication protocol that are supported by the first vehicle 120 for negotiations related to the drafting operations. In some cases, the drafting setup information can also include payment information. Drafting operations provide savings for the following vehicles, and therefore the first vehicle 120 may demand payment from the second vehicle 122 in order to share the proceeds of the savings and the costs of additional risks involved in the drafting operation. The payment information can include information related to payment rate (e.g., per minute or per mile), acceptable payment methods (e.g., credit card, debit card, online money transfer, wire transfer, electronic funds transfer, cryptocurrency, or smart contract) or other information related to payment.

In some cases, the drafting setup information can be broadcasted in the same message as the drafting indication, or in a different message. In some cases, the drafting setup information can be provided upon inquiry. For example, the second vehicle 122 can receive the drafting capability indication from the first vehicle 120 and determine that the first vehicle 120 is capable of being a leader in a drafting group. The second vehicle 122 can send a drafting request to the first vehicle 120. In response, the first vehicle 120 can send the drafting setup information to the second vehicle 122. Based on the drafting setup information in the drafting response, the second vehicle 122 can determine whether to establish a drafting group with the first vehicle 120 as the leader and the second vehicle 122 as the follower. Alternatively or additionally, the second vehicle 122 can include its drafting setup information, e.g., identity, compatibility information, and payment information (for example, the rate that the second vehicle 122 is willing to pay as a follower) in the drafting request. Based on the drafting setup information in the drafting request, the first vehicle 120 can determine whether to establish a drafting group with the first vehicle 120 as the leader and the second vehicle 122 as the follower.

In some cases, multiple stages of negotiations may be conducted at step 220 to establish the drafting group. For example, requests and responses can be communicated between the first vehicle 120 and the second vehicle 122 to agree on the speed, acceleration, or other driving parameters of the drafting group. Requests and responses can also be communicated between the first vehicle 120 and the second vehicle 122 to agree on the rate or payment method of the drafting group. In some cases, a block chain protocol (e.g. Ethereum, Tangle, Interest on Trust Accounts (IOTA)) and a smart contract can be established between the first vehicle 120 and the second vehicle 122. In particular, a smart contract can set out the rate of payment per mile to be billed upon termination of the drafting activity. When the drafting activity stops, the conditions for the smart contract is complete and a transaction can execute securely on the block chain on behalf of the vehicles. The smart contract or payment information such as a cryptocurrency address (e.g. Bitcoin wallet address) credit or debit card number, micropayment platform information (e.g. Tibit, Blendle, Fattr, Square) can be included in the requests and responses during the negotiations. These negotiation requests and responses can be transmitted using a V2V communication protocol, using a drafting-specific message or a general V2V messages.

In some cases, security protocols can be negotiated between the first vehicle 120 and the second vehicle 122 to establish a secure communication channel for the drafting group. For example, Transport Layer Security (TLS) protocols or other security protocols can be used to establish a shared key between the first vehicle 120 and the second vehicle 122. The first vehicle 120 and the second vehicle 122 can use the shared key to encrypt messages transmitted between them. In some cases, the types of messages to be encrypted between the first vehicle 120 and the second vehicle 122 can be negotiated. For example, time sensitive information such as driving information (pending acceleration or turning that is about to be executed by the leader) may not be encrypted so that the autopilot processing platform of the receiving vehicle can process such information quickly. On the other hand, security sensitive information, e.g., information related to payment, may be encrypted.

If the negotiation is successful, the first vehicle 120, the second vehicle 122, or both can send a confirmation message to confirm the establishment of the drafting group. If the negotiation is not successful, the first vehicle 120, the second vehicle 122, or both can send a failure message so that either vehicle can continue to search for other vehicles to establish a drafting group.

While the previous descriptions illustrate an example of establishing a drafting group that is initiated by the follower (the second vehicle 122), in some cases, a leader (the first vehicle 120) can initiate some or all of the steps to establish a drafting group. For example, the second vehicle 122 can broadcast a drafting capability indication that indicates whether the second vehicle 122 is looking for a leader. The first vehicle 120 can receive the drafting capability indication and send a request to the second vehicle 122 to establish a drafting group.

In some cases, a drafting group can include more than two vehicles. For example, after the first vehicle 120 and the second vehicle 122 establish a drafting group, a third vehicle can attempt to join the drafting group. The first vehicle 120, the second vehicle 122, or both can broadcast information related to the drafting group, and the third vehicle can send request to either vehicle to join the drafting group. The first vehicle 120, the second vehicle 122, or both can negotiate with the third vehicle and determine whether to accept the third vehicle into the drafting group.

After the drafting group is established, at step 230, the first vehicle 120 and the second vehicle 122 perform in-drafting communications. The in-drafting communications can include driving information updates such as information related to pending acceleration, deceleration, or turning operations. The in-drafting communications can also include payment information. For example, the second vehicle 122 can send payment information to the first vehicle 120 every mile, every minute, or both. As discussed previously, the in-drafting communications can be performed using a secure communication channel established during step 220.

At 240, the second vehicle 122 determines to leave the drafting group. In one example, the autopilot processing platform of the second vehicle 122 can determine that the route for the second vehicle 122 deviates from that of the first vehicle 120. In another example, the autopilot processing platform of the second vehicle 122 can determine that the traveling speed of the first vehicle 120 no longer matches the needs of the second vehicle 122. In yet another example, the autopilot processing platform of the second vehicle 122 can determine that the driving behavior of the first vehicle 120 no longer matches the safety configurations in the drafting profile of the second vehicle 122.

At 250, the second vehicle 122 and the first vehicle 120 perform the termination procedure of the drafting group. For example, the second vehicle 122 can send a termination indication to the first vehicle 120 to indicate that the second vehicle 122 would leave the drafting group. In some cases, the second vehicle 122 can also send final payment information to the first vehicle 120. For example, the first vehicle 120 and the second vehicle 122 may establish a smart contract that is executable at the termination of the drafting operation. A smart contract is established when the vehicles start to draft each other. For example, the contract can include a rule stating that, when drafting stops, payment will be made according to a certain rate. The contract can also include payment information like a cryptocurrency wallet address. A smart contract can be executed without additional communication. If drafting operation stops, the contract is executed and payment will be made based on the rules of the contract. Additional messages between the vehicles can also be used to trigger the smart contract or to report exact distances or other information.

While the previous descriptions illustrate an example of discontinuing a drafting group that is initiated by the follower (the second vehicle 122), in some cases, a leader (the first vehicle 120) can initiate some or all of the steps to discontinue the drafting group. For example, the first vehicle 120 can determine to leave the drafting group and send a termination indication to the second vehicle 122. The termination indication can trigger the second vehicle 122 to send payment information to the first vehicle 120 to complete the payment.

In some cases, a drafting group can have more than two vehicles. In these cases, the drafting group can continue to operate after one vehicle terminates its drafting operation and leaves the drafting group. In some cases, the remaining vehicles may re-negotiate some configurations of the drafting group after one vehicle leaves.

As illustrated in FIG. 2, the communications between the first vehicle 120 and the second vehicle 122 use V2V messages. Alternatively or in combination, some or all of these communications, e.g., at steps 220, 230, 250, or any combinations thereof, can be conducted using V2I communication protocols. For example, the first vehicle 120 can transmit the information in a V2I message to a server, and the server can forward the information in a V2I message to the second vehicle 122.

Figure 3:
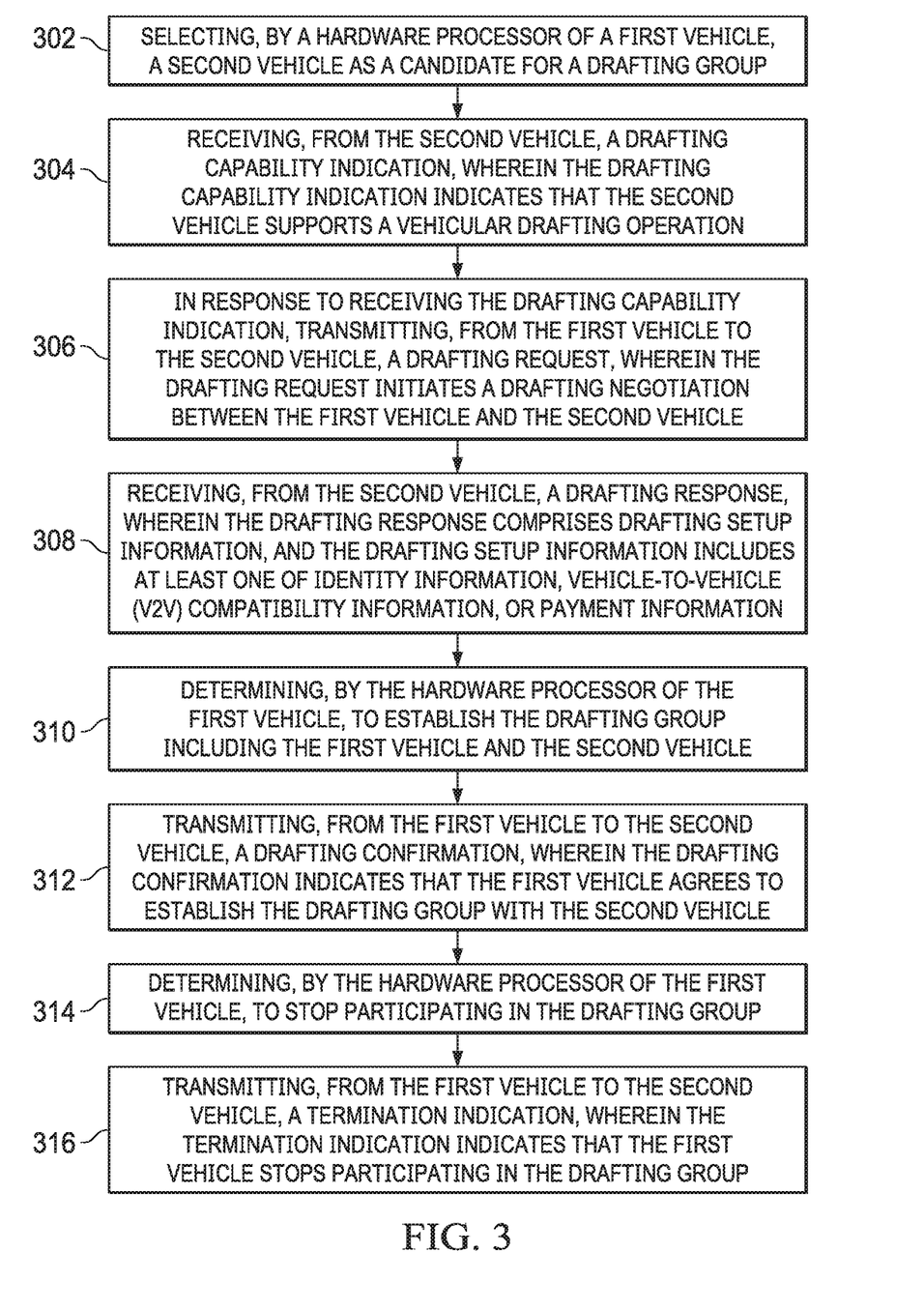
FIG. 3 is a flow diagram showing an example method that provides inter-vehicle data communications for vehicular drafting operations, according to an implementation Like reference numbers and designations in the various drawings indicate like elements.

FIG. 3 is a flow diagram showing an example method 300 that provides inter-vehicle data communications for vehicular drafting operations, according to an implementation. The method 300 can be implemented by the entities shown in FIG. 1, including, for example, the second vehicle 122. The method 300 shown in FIG. 3 can also be implemented using additional, fewer, or different entities. Furthermore, the method 300 shown in FIG. 3 can be implemented using additional, fewer, or different operations, which can be performed in the order shown or in a different order. In some instances, an operation or a group of operations can be iterated or repeated, for example, for a specified number of iterations or until a terminating condition is reached.

At 302, a hardware processor of a first vehicle selects a second vehicle as a candidate for a drafting group. At 304, the first vehicle receives, from the second vehicle, a drafting capability indication, wherein the drafting capability indication indicating that the second vehicle supports a vehicular drafting operation. At 306, the first vehicle, in response to receiving the drafting capability indication, transmits to the second vehicle, a drafting request, wherein the drafting request initiates a drafting negotiation between the first vehicle and the second vehicle. At 308, the first vehicle receives, from the second vehicle, a drafting response, wherein the drafting response comprises drafting setup information, wherein the drafting setup information includes at least one of identity information, vehicle-to-vehicle (V2V) compatibility information, or payment information. At 310, a hardware processor of the first vehicle determines to establish the drafting group including the first vehicle and the second vehicle. At 312, the first vehicle transmits, to the second vehicle, a drafting confirmation, wherein the drafting confirmation indicates that the first vehicle agrees to establish the drafting group with the second vehicle. At 314, a hardware processor of the first vehicle determines to stop participating in the drafting group. At 316, the first vehicle transmits, to the second vehicle, a termination indication, wherein the termination indication indicates that the first vehicle stops participating in the drafting group.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   determining, by a first vehicle, a driving parameter for each of a plurality of other vehicles near the first vehicle, wherein the driving parameter comprises at least one of a speed parameter or an acceleration parameter of the respective other vehicle, and the determining the driving parameter comprises processing recorded images of a respective driving operation of each of the plurality of other vehicles;
   selecting, by a hardware processor of the first vehicle and based on the determined driving parameter, a second vehicle from the plurality of other vehicles as a candidate for a leading vehicle in a drafting group, wherein selecting the second vehicle as the candidate for the leading vehicle in the drafting group comprises:
      comparing, by the hardware processor of the first vehicle, the determined driving parameter with one or more configurations in a drafting profile of the first vehicle; and
      selecting, based on the comparing, the second vehicle as the candidate for the leading vehicle in the drafting group based on the determined driving parameter meeting the one or more configurations in the drafting profile of the first vehicle;
   receiving, from the second vehicle, a drafting capability indication, wherein the drafting capability indication indicates that the second vehicle supports a vehicular drafting operation;
   in response to receiving the drafting capability indication, transmitting, from the first vehicle to the second vehicle, a drafting request, wherein the drafting request initiates a drafting negotiation between the first vehicle and the second vehicle;
   receiving, from the second vehicle, a drafting response, wherein the drafting response comprises drafting setup information, and the drafting setup information includes at least one of identity information, vehicle-to-vehicle (V2V) compatibility information, or payment information;
   determining, by the hardware processor of the first vehicle, to establish the drafting group including the first vehicle and the second vehicle; and
   transmitting, from the first vehicle to the second vehicle, a drafting confirmation, wherein the drafting confirmation indicates that the first vehicle agrees to establish the drafting group with the second vehicle.

2. The method of claim 1, wherein the drafting capability indication is received in a broadcast V2V message.

3. The method of claim 1, further comprising: establishing a secure communication channel between the first vehicle and the second vehicle.

4. The method of claim 3, further comprising: transmitting payment information from the first vehicle to the second vehicle using the secure communication channel, wherein the payment information is transmitted using an encrypted V2V message.

5. The method of claim 1, further comprising:
   determining, by the hardware processor of the first vehicle, to stop participating in the drafting group; and
   transmitting, from the first vehicle to the second vehicle, a termination indication, wherein the termination indication indicates that the first vehicle stops participating in the drafting group.

6. The method of claim 1, further comprising: receiving, from a third vehicle, a second drafting request, wherein the second draft requests to join the drafting group.

7. A first vehicle, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   determining a driving parameter for each of a plurality of other vehicles near the first vehicle, wherein the driving parameter comprises at least one of a speed parameter or an acceleration parameter of the respective other vehicle, and the determining the driving parameter comprises processing recorded images of a respective driving operation of each of the plurality of other vehicles;
   selecting, based on the determined driving parameter, a second vehicle from the plurality of other vehicles as a candidate for a leading vehicle a drafting group, wherein selecting the second vehicle as the candidate for the leading vehicle in the drafting group comprises:
      comparing, by the hardware processor of the first vehicle, the determined driving parameter with one or more configurations in a drafting profile of the first vehicle; and
      selecting, based on the comparing, the second vehicle as the candidate for the leading vehicle in the drafting group based on the determined driving parameter meeting the one or more configurations in the drafting profile of the first vehicle;
   receiving, from the second vehicle, a drafting capability indication, wherein the drafting capability indication indicates that the second vehicle supports a vehicular drafting operation;
   in response to receiving the drafting capability indication, transmitting, from the first vehicle to the second vehicle, a drafting request, wherein the drafting request initiates a drafting negotiation between the first vehicle and the second vehicle;
   receiving, from the second vehicle, a drafting response, wherein the drafting response comprises drafting setup information, and the drafting setup information includes at least one of identity information, vehicle-to-vehicle (V2V) compatibility information, or payment information;
   determining, by the first vehicle, to establish the drafting group including the first vehicle and the second vehicle; and
   transmitting, from the first vehicle to the second vehicle, a drafting confirmation, wherein the drafting confirmation indicates that the first vehicle agrees to establish the drafting group with the second vehicle.

8. The first vehicle of claim 7, wherein the drafting capability indication is received in a broadcast V2V message.

9. The first vehicle of claim 7, the operations further comprising: establishing a secure communication channel between the first vehicle and the second vehicle.

10. The first vehicle of claim 9, the operations further comprising: transmitting payment information from the first vehicle to the second vehicle using the secure communication channel, wherein the payment information is transmitting using an encrypted V2V message.

11. The first vehicle of claim 7, the operations further comprising:
   determining, by the hardware processor of the first vehicle, to stop participating in the drafting group; and
   transmitting, from the first vehicle to the second vehicle, a termination indication, wherein the termination indication indicates that the first vehicle stops participating in the drafting group.

12. The first vehicle of claim 7, the operations further comprising: receiving, from a third vehicle, a second drafting request, wherein the second draft requests to join the drafting group.

13. A non-transitory computer-readable medium storing instructions which, when executed, cause a computing device to perform operations comprising:
   determining a driving parameter for each of a plurality of other vehicles near a first vehicle, wherein the driving parameter comprises at least one of a speed parameter or an acceleration parameter of the respective other vehicle, and the determining the driving parameter comprises processing recorded images of a respective driving operation of each of the plurality of other vehicles;
   selecting, by a hardware processor of the first vehicle and based on the determined driving parameter, a second vehicle from the plurality of other vehicles as a candidate for a leading vehicle in a drafting group, wherein selecting the second vehicle as the candidate for the leading vheicle in the drafting group comprises:
      comparing, by the hardware processor of the first vehicle, the determined driving parameter with one or more configurations in a drafting profile of the first vehicle; and
      selecting, based on the comparing, the second vehicle as the candidate for the leading vehicle in the drafting group based on the determined driving parameter meeting the one or more configurations in the drafting profile of the first vehicle;
   receiving, from the second vehicle, a drafting capability indication, wherein the drafting capability indication indicates that the second vehicle supports a vehicular drafting operation;
   in response to receiving the drafting capability indication, transmitting, from the first vehicle to the second vehicle, a drafting request, wherein the drafting request initiates a drafting negotiation between the first vehicle and the second vehicle;
   receiving, from the second vehicle, a drafting response, wherein the drafting response comprises drafting setup information, and the drafting setup information includes at least one of identity information, vehicle-to-vehicle (V2V) compatibility information, or payment information;
   determining, by the hardware processor of the first vehicle, to establish the drafting group including the first vehicle and the second vehicle; and
   transmitting, from the first vehicle to the second vehicle, a drafting confirmation, wherein the drafting confirmation indicates that the first vehicle agrees to establish the drafting group with the second vehicle.

14. The computer-readable medium of claim 13, wherein the drafting capability indication is received in a broadcast V2V message.

15. The computer-readable medium of claim 13, the operations further comprising: establishing a secure communication channel between the first vehicle and the second vehicle.

16. The computer-readable medium of claim 15, the operations further comprising: transmitting payment information from the first vehicle to the second vehicle using the secure communication channel, wherein the payment information is transmitted using an encrypted V2V message.

17. The computer-readable medium of claim 13, the operations further comprising:
   determining, by the hardware processor of the first vehicle, to stop participating in the drafting group; and
   transmitting, from the first vehicle to the second vehicle, a termination indication, wherein the termination indication indicates that the first vehicle stops participating in the drafting group.

* * * * *

UNITED STATES PATENT AND TRADEMARK OFFICE
CERTIFICATE OF CORRECTION

PATENT NO. : 11,120,693 B2
APPLICATION NO. : 15/955396
DATED : September 14, 2021
INVENTOR(S) : Conrad Delbert Seaman et al.

Page 1 of 1

It is certified that error appears in the above-identified patent and that said Letters Patent is hereby corrected as shown below:

In the Claims

In Column 14, Line 26, In Claim 7, after "vehicle" insert -- in --, therefor.

In Column 15, Line 33 (Approx.), In Claim 13, delete "vheicle" and insert -- vehicle --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*